United States Patent
Yamanaka et al.

(10) Patent No.: US 11,466,163 B2
(45) Date of Patent: Oct. 11, 2022

(54) LAMINATED COATING FILM, COATED ARTICLE, AND METHOD FOR FORMING LAMINATED COATING FILM

(71) Applicants: NIPPON PAINT AUTOMOTIVE COATINGS CO., LTD., Osaka (JP); MAZDA MOTOR CORPORATION, Hiroshima (JP)

(72) Inventors: Eiji Yamanaka, Hirakata (JP); Masaharu Arashi, Hirakata (JP); Hiroshi Kiyonaga, Hirakata (JP); Hideaki Tsujioka, Hirakata (JP); Takakazu Yamane, Hiroshima (JP); Kouji Teramoto, Hiroshima (JP)

(73) Assignees: NIPPON PAINT AUTOMOTIVE COATINGS CO., LTD., Osaka (JP); MAZDA MOTOR CORPORATION, Hiroshima (JP)

( * ) Notice: Subject to any disclaimer, the term of this patent is extended or adjusted under 35 U.S.C. 154(b) by 524 days.

(21) Appl. No.: 16/482,537

(22) PCT Filed: Jan. 30, 2018

(86) PCT No.: PCT/JP2018/003033
§ 371 (c)(1),
(2) Date: Jul. 31, 2019

(87) PCT Pub. No.: WO2018/143219
PCT Pub. Date: Aug. 9, 2018

(65) Prior Publication Data
US 2020/0354589 A1 Nov. 12, 2020

(30) Foreign Application Priority Data
Feb. 1, 2017 (JP) .............................. JP2017-017047

(51) Int. Cl.
*B32B 7/02* (2019.01)
*B05D 7/14* (2006.01)
(Continued)

(52) U.S. Cl.
CPC ............... *C09D 7/41* (2018.01); *B05D 5/066* (2013.01); *B05D 7/142* (2013.01); *B05D 7/572* (2013.01);
(Continued)

(58) Field of Classification Search
CPC . B05D 5/06; B05D 5/066; B05D 7/56; B05D 7/14; B05D 7/142; B05D 7/144; B32B 7/02
See application file for complete search history.

(56) References Cited

U.S. PATENT DOCUMENTS

| 2013/0048501 A1 | 2/2013 | Yamane et al. |
| 2015/0217332 A1 | 8/2015 | Fujii et al. |
| 2016/0122561 A1 | 5/2016 | Kato et al. |

FOREIGN PATENT DOCUMENTS

| CN | 102933317 A | 2/2013 |
| CN | 105228827 A | 1/2016 |

(Continued)

OTHER PUBLICATIONS

Computer-generated English-language translation of JP-2016185527-A.*

(Continued)

*Primary Examiner* — Vu A Nguyen
(74) *Attorney, Agent, or Firm* — Studebaker & Brackett PC

(57) ABSTRACT

In a coated article including a laminated coating film configured such that a first base layer 3 containing a lustrous material 11 and a second base layer 4 and a transparent clear layer 5 containing an organic pigment 15 are stacked on each (Continued)

other in this order on a coating target object, the same type of organic ultraviolet absorbing agent 13 having a molecular weight of equal to or greater than 500 is added to the first base layer 3 and the second base layer 4.

14 Claims, 3 Drawing Sheets

(51) Int. Cl.
    *B05D 5/06*     (2006.01)
    *C09D 7/41*     (2018.01)
    *C09D 7/40*     (2018.01)
    *C09D 7/48*     (2018.01)
    *B05D 7/00*     (2006.01)
    *C09B 5/62*     (2006.01)
    *B22F 1/08*     (2022.01)
    *B22F 1/14*     (2022.01)
    *B44F 1/08*     (2006.01)
    *B44F 1/14*     (2006.01)
    *C09D 133/02*     (2006.01)
    *C09D 175/04*     (2006.01)
(52) U.S. Cl.
    CPC .................. *B22F 1/08* (2022.01); *B22F 1/14* (2022.01); *B44F 1/08* (2013.01); *B44F 1/14* (2013.01); *C09B 5/62* (2013.01); *C09D 7/48* (2018.01); *C09D 7/67* (2018.01); *B05D 2202/10* (2013.01); *C09D 133/02* (2013.01); *C09D 175/04* (2013.01); *Y10T 428/24876* (2015.01)

(56) References Cited

FOREIGN PATENT DOCUMENTS

| | | |
|---|---|---|
| EP | 1 826 233 A1 | 8/2007 |
| JP | H09-214976 A | 8/1997 |
| JP | 2001-347223 A | 12/2001 |
| JP | 2006-281451 A | 10/2006 |
| JP | 2007-167720 A | 7/2007 |
| JP | 2011-240255 A | 12/2011 |
| JP | 2014-042891 A | 3/2014 |
| JP | 2016-185527 A | 10/2016 |
| JP | 2016185527 A * | 10/2016 ............... B05D 1/36 |
| JP | 2016-188332 A | 11/2016 |

OTHER PUBLICATIONS

BASF TINUVIN 384-2 Technical Data Sheet.*
International Search Report issued in PCT/JP2018/003033; dated Apr. 17, 2018.

* cited by examiner

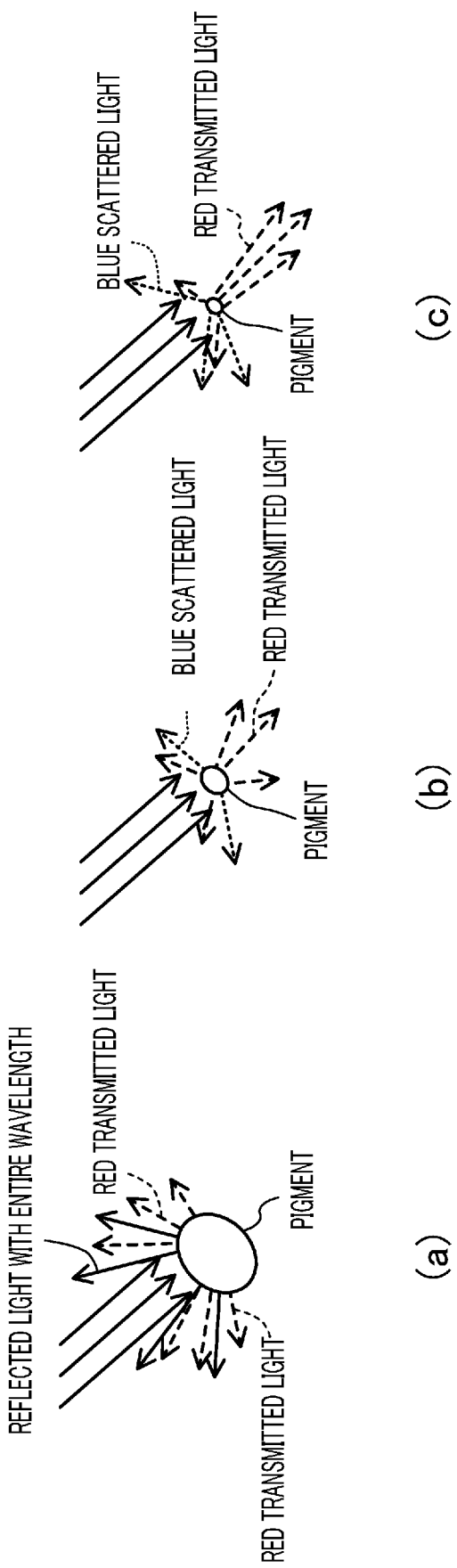

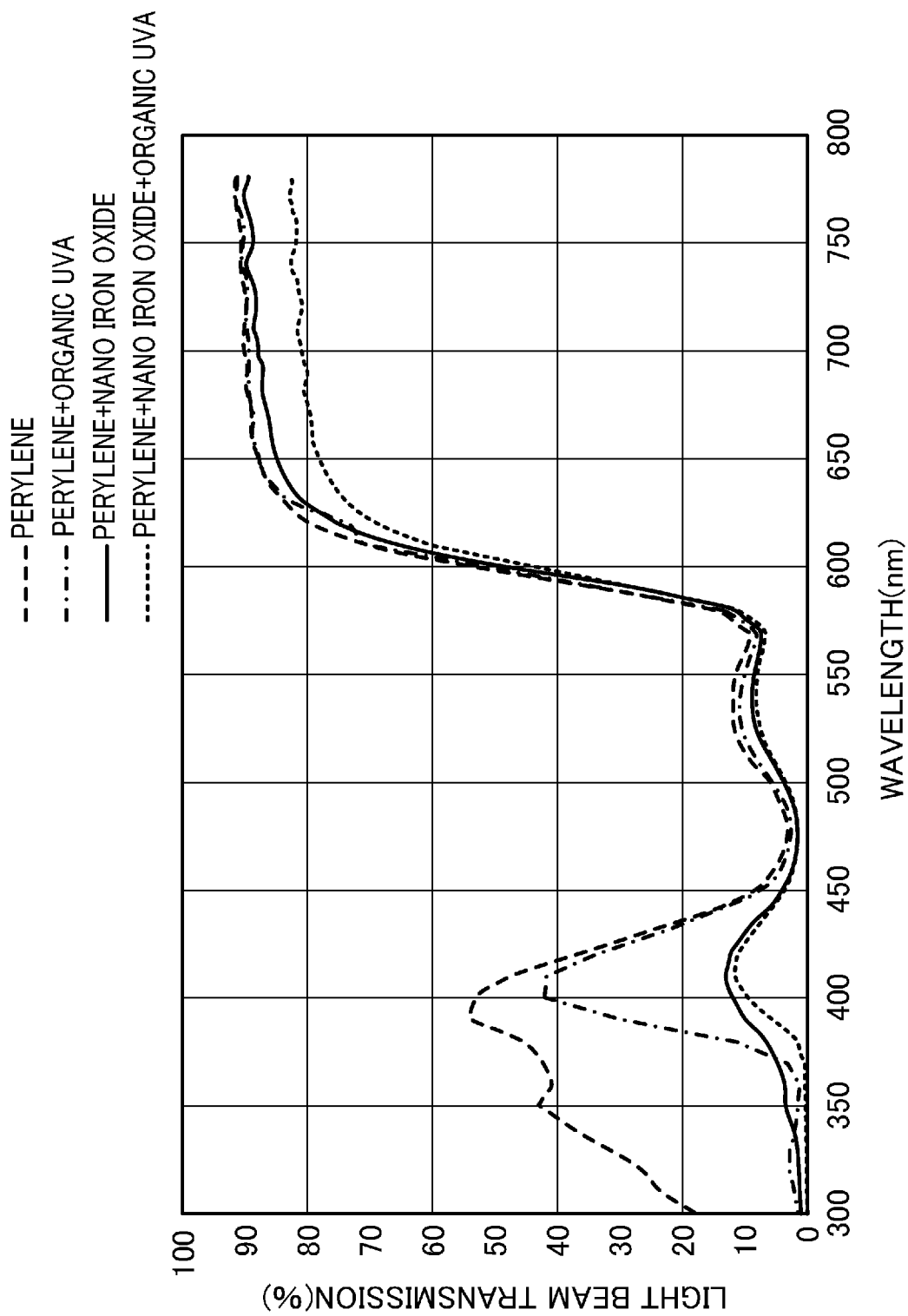

LAMINATED COATING FILM, COATED ARTICLE, AND METHOD FOR FORMING LAMINATED COATING FILM

TECHNICAL FIELD

The present invention relates to a laminated coating film, a coated article, and a laminated coating film formation method.

BACKGROUND ART

In recent years, it has been demanded for a coating target object, such as an automobile, for which a high designability is demanded that a coating color with a high chroma at highlights is obtained. On this point, Patent Document 1 describes a molding multilayer sheet useful for, e.g., an automobile-relating member, and describes that a design with the sense of depth is obtained. That is, in the multilayer sheet configured such that a colored layer is stacked on a metal glossy layer, the brightness L* of transmitted light of the colored layer is 20 to 80, the gloss value of the metal glossy layer is equal to or greater than 200, and the chroma C* of regularly-reflected light at 45 degrees is equal to or greater than 150. However, the above-described molding multilayer sheet is limited in terms of use applications.

CITATION LIST

Patent Document

Patent Document 1: Japanese Unexamined Patent Publication No. 2006-281451

SUMMARY OF THE INVENTION

Technical Problem

It is generally known that a laminated coating film configured such that a first base layer (a metallic base layer) containing a lustrous material, a second base layer (a color clear layer) containing an organic pigment, and a transparent clear layer are stacked on each other in this order on a coating target object is provided. According to such a laminated coating film, a coating color with a high designability can be obtained, but deterioration of the organic pigment due to ultraviolet light, i.e., color deterioration, has been observed.

An object of the present invention is to reliably protect an organic pigment of a second base layer from ultraviolet light and reduce color deterioration of a laminated coating film for a long period of time.

Solution to the Problem

For solving the above-described problem, the same type of organic ultraviolet absorbing agent having a great molecular weight is added to first and second base layers according to the present invention.

A laminated coating film disclosed herein includes a first base layer stacked on a surface of a coating target object and containing a lustrous material, a translucent second base layer stacked on a surface of the first base layer and containing an organic pigment, and a transparent clear layer stacked on a surface of the second base layer.

The coating target object is a vehicle body of an automobile or an interior or exterior part for the automobile, the first and second base layers contains the same type of organic ultraviolet absorbing agent having a molecular weight of equal to or greater than 500, and the organic pigment is a red pigment.

In the laminated coating film, the organic ultraviolet absorbing agent in the second base layer has a great molecular weight, and therefore, an ultraviolet absorbing effect is provided for a longer period of time as compared to an ultraviolet absorbing agent having a low molecular weight.

The same type of ultraviolet absorbing agent is added not only to the second base layer but also to the first base layer for reducing transfer of the ultraviolet absorbing agent from the second base layer to the first base layer.

Such a point will be more specifically described.

First, the ultraviolet absorbing agent is on a transparent clear layer side with respect to the red pigment so that such a pigment can be effectively protected from ultraviolet light. However, when the ultraviolet absorbing agent is merely dispersed in the second base layer, such an ultraviolet absorbing agent is not always on the transparent clear layer side with respect to the red pigment. The present invention does not discourage addition of the ultraviolet absorbing agent to the transparent clear layer. However, the transparent clear layer is a top coat layer of the laminated coating film, and a surface thereof is exposed to the outside. That is, the surface is directly exposed to rainwater and light. For this reason, even when the ultraviolet absorbing agent is added to the transparent clear layer, such an ultraviolet absorbing agent is easily lost from the surface of the transparent clear surface, and the decrease rate of the ultraviolet absorbing agent is high.

On the other hand, there is no problem in transfer of the ultraviolet absorbing agent added to the second base layer to the transparent clear layer side, and such transfer is rather preferable. That is, such transfer compensates for the decrease in the ultraviolet absorbing agent of the transparent clear layer, and the ultraviolet absorbing agent is on the transparent clear layer side with respect to the red pigment. Thus, it is advantageous in protection of such a pigment from ultraviolet light.

However, if the organic ultraviolet absorbing agent is added only to the second base layer and is not added to the first base layer, the ultraviolet absorbing agent of the second base layer not only moves to the transparent clear layer side but also to a first base layer side, and therefore, the amount of movement to the transparent clear layer side is smaller. Rather, more ultraviolet absorbing agent of the second base layer does not move to the transparent clear layer side but to the first base layer side. Thus, the amount of ultraviolet absorbing agent on the transparent clear layer side with respect to the red pigment of the second base layer is not so much as expected.

For these reasons, in the present invention, the ultraviolet absorbing agent is added not only to the second base layer but also to the first base layer, and therefore, movement of the ultraviolet absorbing agent to the first base layer side is reduced and more ultraviolet absorbing agent relatively moves to the transparent clear layer side. Thus, the red pigment of the second base layer is effectively protected, and therefore, a laminated coating film color deterioration prevention effect is obtained for a long period of time.

Preferably, the concentration of the ultraviolet absorbing agent of the second base layer is equal to or higher than ⅓ times and equal to or lower than three times as high as the concentration of the ultraviolet absorbing agent of the first base layer.

In a preferable embodiment, the average particle size (a "number average particle size," the same applies to the following) of the red pigment of the second base layer is equal to or less than 100 nm.

When such a nanoparticle pigment is employed, the particle size thereof is smaller than the wavelength of visible light, and therefore, diffused reflected light of the visible light due to pigment particles is reduced. Moreover, a light transmission for a wavelength of equal to or lower than 600 nm decreases, and a light transmission for red exceeding a wavelength of 600 nm increases. That is, it is advantageous in obtaining of sort of a transparent red coating color with a high chroma.

Meanwhile, due to a small pigment particle size, deterioration of the pigment due to ultraviolet light is easily accelerated, and scattering (Rayleigh scattering) of blue light with a short wavelength is easily caused. However, such a pigment can be protected from ultraviolet light by the organic ultraviolet absorbing agent, and blue light due to Rayleigh scattering can be absorbed.

That is, the organic ultraviolet absorbing agent is added to both of the first and second base layers, and therefore, the effect of protecting the pigment from ultraviolet light and the effect of absorbing Rayleigh scattered light are obtained. Thus, a much higher chroma can be realized by a nanosized pigment particle size, and a high-chroma color can be maintained for a long period of time.

In a preferable embodiment, at least the second base layer contains an inorganic ultraviolet absorbing agent having a particle size of equal to or less than 100 nm.

The organic ultraviolet absorbing agent is effective for absorbing ultraviolet light, but due to characteristics thereof, absorbability of light with a wavelength of around 400 nm is not so high. For this reason, in this embodiment, the inorganic nanoparticle ultraviolet absorbing agent having a small particle size is added to the second base layer. Thus, a light transmission for a wavelength of equal to or lower than 450 nm can be greatly decreased, and therefore, it is advantageous in protection of the first base layer or a base (e.g., an electrodeposition coating) of the first base layer from ultraviolet light.

Further, with the inorganic nanoparticle ultraviolet absorbing agent, the ultraviolet absorbing effect can be obtained without interference with generation of a high-chroma coating color by the nanoparticle pigment. In addition, the inorganic ultraviolet absorbing agent leads to almost no deterioration due to ultraviolet light, and does not substantially move in the coating. Thus, the ultraviolet absorbing effect is maintained for a long period of time. Consequently, the additive amount of the organic ultraviolet absorbing agent to the second base layer can be decreased by addition of the inorganic nanoparticle ultraviolet absorbing agent to the second base layer, and it is advantageous in generation of a high-chroma coating color by the nanoparticle pigment.

In a preferable embodiment, the coating target object has the electrodeposition coating on a surface, and the first base layer is stacked on a surface of the electrodeposition coating. In addition to the organic ultraviolet absorbing agent, the inorganic ultraviolet absorbing agent further protects the electrodeposition coating from ultraviolet light. Thus, deterioration of a surface layer portion of the electrodeposition coating is prevented, and detachment of the laminated coating film on such a coating is prevented.

Considering protection of the electrodeposition coating from ultraviolet light, the inorganic ultraviolet absorbing agent is preferably added not only to the second base layer but also to the first base layer.

In a preferable embodiment, the first base layer contains a pigment. Thus, light diffused and reflected on the lustrous material through the second base layer is absorbed by the pigment of the first base layer. Thus, a brightness changes due to the angle of viewing the coated article, and the sense of shadow or the sense of metal of the laminated coating film is enhanced.

A laminated coating film formation method disclosed herein includes the step of coating a surface of a coating target object with first base paint to form an uncured first base layer, the step of coating a surface of the uncured first base layer with second base paint to form an uncured second base layer having translucency, the step of coating a surface of the uncured second base layer with clear paint to form an uncured transparent clear layer, and the step of simultaneously heating and curing the uncured first base layer, the uncured second base layer, and the uncured transparent clear layer.

The coating target object is an automobile vehicle body or an automobile interior or exterior part having a cured electrodeposition coating on a surface, the first base paint contains a lustrous material and an organic ultraviolet absorbing agent having a molecular weight of equal to or greater than 500, and the second base paint contains an organic red pigment and an organic ultraviolet absorbing agent identical to the ultraviolet absorbing agent of the first base paint, the ultraviolet absorbing agent having a molecular weight of equal to or greater than 500.

With this configuration, the laminated coating film configured such that color deterioration and deterioration of the electrodeposition coating due to ultraviolet light are reduced for a long period of time can be formed.

In a preferable embodiment of the laminated coating film formation method, the average particle size of the red pigment is equal to or less than 100 nm.

In a preferable embodiment of the laminated coating film formation method, the red pigment is perylene red.

In a preferable embodiment of the laminated coating film formation method, the second base paint contains an inorganic ultraviolet absorbing agent having a particle size of equal to or less than 100 nm.

In a preferable embodiment of the laminated coating film formation method, the inorganic ultraviolet absorbing agent is an iron oxide nanoparticle.

In a preferable embodiment of the laminated coating film formation method, the first base paint contains a red pigment.

The automobile interior or exterior parts include, for example, automobile interior parts such as a console panel, an instrument panel, each pillar trim, and a door trim and automobile exterior parts such as a bumper, a side sill garnish, a side mirror housing, a front under spoiler, a rear under spoiler, and a radiator grille panel.

Advantages of the Invention

According to the present invention, the laminated coating film includes the first base layer stacked on the surface of the coating target object and containing the lustrous material, the translucent second base layer stacked on the surface of the first base layer and containing the red pigment, and the transparent clear layer stacked on the surface of the second base layer, and the first and second base layers contain the same type of organic ultraviolet absorbing agent having a molecular weight of equal to or greater than 500. Thus, transfer of the ultraviolet absorbing agent from the second base layer to the first base layer side is reduced, and more ultraviolet absorbing agent relatively moves to the transparent clear layer side. Thus, the red pigment of the second base layer is effectively protected by the ultraviolet absorbing agent, and the laminated coating film color deterioration prevention effect is obtained for a long period of time.

BRIEF DESCRIPTION OF THE DRAWINGS

FIG. 2 illustrates views for describing a difference in a phenomenon due to a pigment particle size when visible light enters a red pigment.

FIG. 3 illustrates a graph of a light transmission spectrum regarding various second base layers.

DESCRIPTION OF EMBODIMENTS

Figure 1:
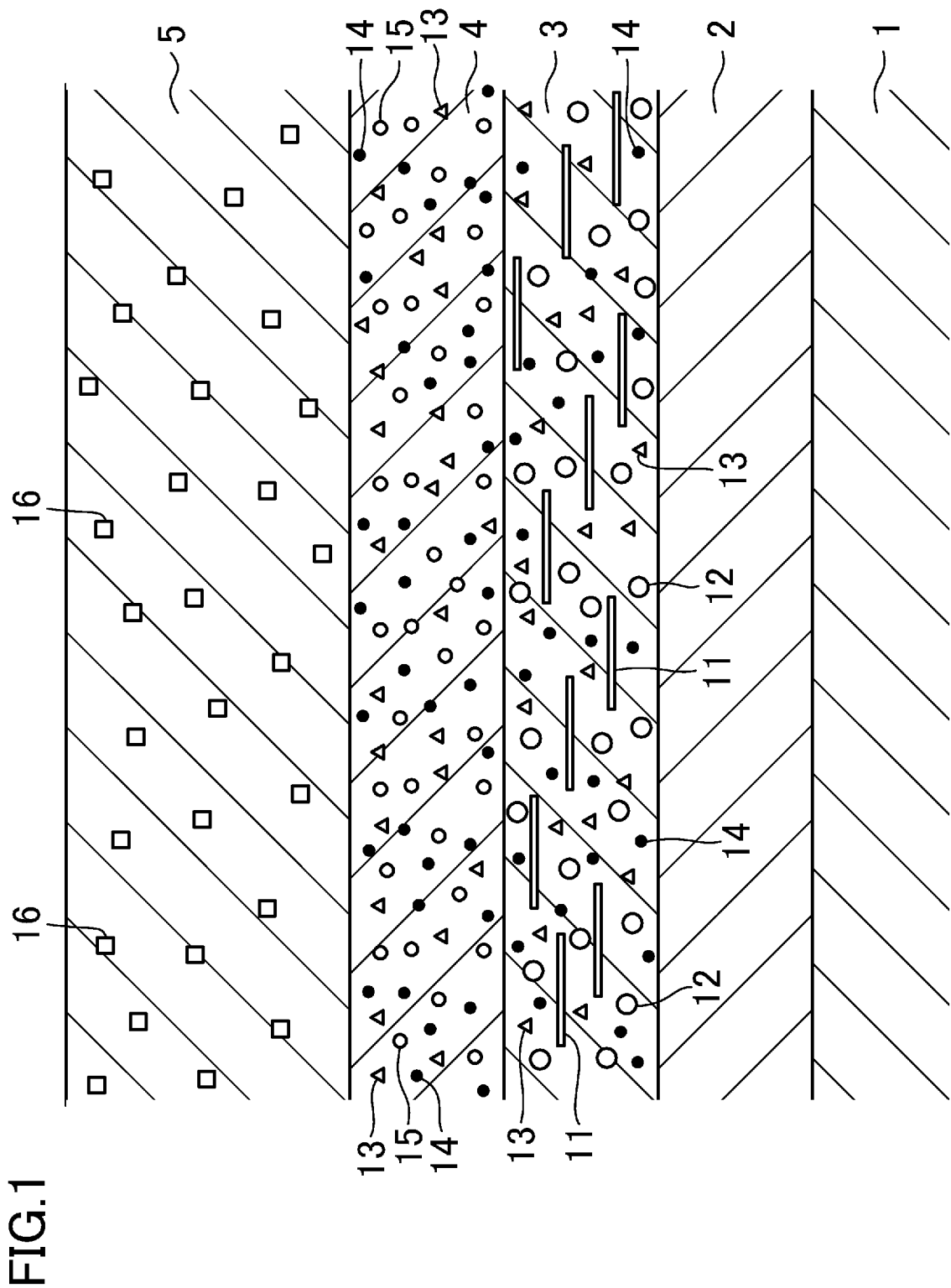
FIG. 1 illustrates a schematic sectional view of a coated article.

Hereinafter, an embodiment of the present invention will be described with reference to the drawings. Description of the preferable embodiment below will be set forth merely as an example in nature, and is not intended to limit the present invention and applications and use thereof.

<Configuration Example of Laminated Coating Film>

A coated article according to the present embodiment illustrated in FIG. 1 is configured such that a laminated coating film including a first base layer 3 and a second base layer 4 and a transparent clear layer 5 having translucency is provided on a coating target object provided with a cation electrodeposition coating 2 on a surface of a vehicle body (steel plate) 1 of an automobile. The first base layer 3 dispersively contains, in resin, a lustrous material 11, a red pigment 12, an organic high-molecular-weight ultraviolet absorbing agent 13 having a molecular weight of equal to or greater than 500, and an inorganic nanoparticle ultraviolet absorbing agent 14. The second base layer 4 dispersively contains, in resin, an organic red pigment 15, an organic high-molecular-weight ultraviolet absorbing agent 13 having a molecular weight of equal to or greater than 500, and an inorganic nanoparticle ultraviolet absorbing agent 14. The transparent clear layer 5 dispersively contains an organic ultraviolet absorbing agent 16 in resin.

Although not specifically limited, a flake-shaped lustrous material, specifically aluminum flakes, is preferably employed as the lustrous material 11 of the first base layer 3.

Although not specifically limited, quinacridone, diketo-pyrrolo-pyrrole, anthraquinone, perylene, perinone, or indigoid can be, for example, employed as the red pigment 12 of the first base layer 3. Specifically, considering, e.g., generation of a red color with a high chroma, perylene red is preferably employed.

Although not specifically limited, a high-molecular-weight benzotriazole-based ultraviolet absorbing agent such as CAS No. 103597-45-1 (a molecular weight of 659) or a triazine-based ultraviolet absorbing agent such as CAS No. 371146-04-2 (a molecular weight of 512), CAS No. 222529-65-9 (a molecular weight of 700), or CAS No. 153519-44-9 (a molecular weight of 647) can be, for example, employed as the ultraviolet absorbing agent 13 of the first base layer 3 and the second base layer 4 with a molecular weight of equal to or greater than 500.

Regarding the ultraviolet absorbing agent 13, a greater molecular weight results in more-easily occurrence of diffused reflex due to the ultraviolet absorbing agent. Considering reduction in such diffused reflex, the molecular weight is preferably equal to or less than 700.

Although not specifically limited, metal oxide nanoparticles such as zinc oxide or iron oxide can be employed as the inorganic nanoparticle ultraviolet absorbing agent 14 of the first base layer 3 and the second base layer 4. Specifically, the iron oxide ($\alpha$-$Fe_2O_3$) nano particles are preferably employed. In the case of the iron oxide nanoparticles, a light transmission for a wavelength of equal to or lower than 600 nm is low (a light transmission for a range from blue to ultraviolet is substantially zero), and a light transmission for red exceeding a wavelength of 600 nm is high. Thus, it is advantageous in generation of the red color with the high chroma.

Although not specifically limited, quinacridone, diketo-pyrrolo-pyrrole, anthraquinone, perylene, perinone, or indigoid can be, for example, employed as the organic red pigment 15 of the second base layer 4. Specifically, considering, e.g., generation of the red color with the high chroma, perylene red is preferably employed.

Although not specifically limited, a benzotriazole-based ultraviolet absorbing agent such as CAS No. 2440-22-4 (a molecular weight of 225), CAS No. 3896-11-5 (a molecular weight of 315), or CAS No. 70321-86-7 (a molecular weight of 447) or a benzophenone-based ultraviolet absorbing agent such as CAS No. 1843-05-6 (a molecular weight of 326) can be, for example, employed as the organic ultraviolet absorbing agent 16 of the transparent clear layer 5.

The first base layer 3 and the second base layer 4 can be formed by coating with water-based base paint or oil-based (solvent-type) base paint. Regarding the water-based base paint, acrylic resin, polyester resin, polyurethane resin, or vinyl resin can be, although not specifically limited, used as water-based resin as a main component, for example. As necessary, paint additive agents such as a cross-linker, a flat pigment, a curing catalyst, a thickener, an organic solvent, a basic neutralizer, a light stabilizer, a surface conditioner, an oxidation inhibitor, and a silane coupling agent can be mixed with the water-based base paint, for example.

Although not specifically limited, a combination of acrylic resin and/or polyester resin and amino resin or acrylic resin and/or polyester resin having a carboxylic acid/epoxy curing system is, for example, employed as the resin forming the transparent clear layer 5. For example, two-component urethane clear paint contains hydroxy-containing acrylic resin and a polyisocyanate compound. Examples of the organic solvent include, for example, a hydrocarbon-based solvent, an ester-based solvent, a ketone-based solvent, an alcohol-based solvent, an ether-based solvent, and an aromatic petroleum-based solvent. As necessary, pigments, non-water dispersible resin, polymer microparticles, a curing catalyst, a light stabilizer, a coating surface conditioner, an oxidation inhibitor, a fluidity conditioner, and wax can be mixed with the clear paint, for example.

<Particle Size of Red Pigment of Second Base Layer 4 and Ultraviolet Absorbing Requirements>

As illustrated in FIG. 2(a), when the particle size of the red pigment is large (e.g., about 500 nm), a visible light beam having entered the pigment is geometric-optically reflected or scattered across an entire wavelength, and a light transmission for red transmitting through the pigment is low. On the other hand, when the pigment particle size decreases as illustrated in FIGS. 2(b) and 2(c) (FIG. 2(b) is, e.g., 100 nm and FIG. 2(c) is, e.g., 50 nm), geometric-optical reflection is less, and the light transmission for red is higher. Meanwhile, blue scattered light (Rayleigh scattering) occurs.

Thus, considering an increase in red chroma, the average particle size of the red pigment is equal to or less than 100 nm, preferably equal to or less than 70 nm, and more preferably equal to or less than 50 nm.

Note that as described above, when the pigment particle size decreases, bluish coloration occurs due to Rayleigh scattering.

Thus, the ultraviolet absorbing agent is necessary not only for prevention of deterioration of the red pigment 15 of the second base layer 4 due to ultraviolet light and protection of the electrodeposition coating 2 from ultraviolet light but also for avoidance of degradation of the red chroma due to bluish coloration caused by Rayleigh scattering.

FIG. 3 relates to the second base layer, and illustrates a light transmission spectrum in each of the case of adding only the perylene red as the red pigment 15, the case of adding the perylene red and the organic ultraviolet absorbing agent (the organic UVA), the case of adding the perylene red and nano iron oxide (the iron oxide nanoparticles as the inorganic ultraviolet absorbing agent), and the case of adding the perylene red, the organic UVA, and the nano iron oxide. In any case, the thickness of the second base layer is 12 μm. The average particle size of the perylene red is 50 nm, and the additive amount of the perylene red is 2% by mass. The organic UVA is a benzotriazole-based UVA with a molecular weight of 659, and the additive amount of the organic UVA is 3% by mass. The average particle size of the nano iron oxide is 50 nm, and the additive amount of the nano iron oxide is 2% by mass.

In the case of only the perylene red, a great transmission peak is shown at around 400 nm, and a transmission for a wavelength range of equal to or lower than 400 nm is high. On the other hand, in the case (no nano iron oxide) of adding the organic UVA, a transmission for a wavelength range of equal to or lower than 370 nm greatly decreases. In the case (no organic UVA) of adding the iron oxide nanoparticles, a transmission for equal to or lower than 450 nm greatly decreases, but a transmission for around 350 nm is higher than that in the case (no nano iron oxide) of adding the organic UVA. In the case of adding the organic UVA and the nano iron oxide, a peak at around just over 400 nm is lower, and a transmission for a wavelength range of equal to or lower than 370 nm is substantially zero. This shows that the red chroma increases and it is advantageous in protection of the electrodeposition coating from ultraviolet light.

<Specific Examples of Laminated Coating Film>

First Sample

Cation electrodeposition paint was electrodeposited on a dull steel plate (substrate) subjected to zinc phosphate treatment such that the thickness in a dried state is 20 μm, and was baked at 160° C. for 30 minutes. The resultant electrodeposition coating on the coating target object was coated with first base paint (acrylic emulsion-based water-based paint) by a rotary spray electrostatic coating machine, thereby forming an uncured first base layer. This paint was mixed with aluminum flakes of 12% by mass as a lustrous material, perylene red of 8% by mass as a pigment having an average particle size of 50 nm, a high-molecular-weight benzotriazole-based UVA (CAS No. 103597-45-1 (a molecular weight of 659)) of 3% by mass as an organic ultraviolet absorbing agent, and iron oxide nanoparticles (an average particle size of 50 nm) of 2% by mass as an inorganic ultraviolet absorbing agent. As described herein, "% by mass" is a percentage with respect to the entire mass of the solid content of the paint (the same applies to the following).

Next, the first base layer was coated with second base paint (acrylic emulsion-based water-based paint) by the rotary spray electrostatic coating machine, thereby forming an uncured second base layer having translucency. This paint was mixed with perylene red of 2% by mass as an organic pigment, a high-molecular-weight benzotriazole-based UVA (CAS No. 103597-45-1 (a molecular weight of 659)) of 3% by mass as an organic ultraviolet absorbing agent, and iron oxide nanoparticles (an average particle size of 50 nm) of 2% by mass as an inorganic ultraviolet absorbing agent.

Then, the second base layer was coated with two-component urethane clear paint by the rotary spray electrostatic coating machine, thereby forming an uncured transparent clear layer. This clear paint was mixed with a low-molecular-weight benzotriazole-based UVA (CAS No. 70321-86-7 (a molecular weight of 447)) of 5% by mass as an organic ultraviolet absorbing agent.

Thereafter, the uncured first base layer, the uncured second base layer, and the uncured transparent clear layer were simultaneously heated (heated at 140° C. for 20 minutes) and cured.

In the first sample, the thickness of each of the first base layer and the second base layer in the dried state was 12 μm, and the thickness of the transparent clear layer in the dried state was 30 μm.

Note that after wet-on-wet coating of the first base paint and the second base paint, pre-heating (heating at 80° C. for three minutes) may be performed, and baking (heating at 140° C. for 20 minutes) may be performed after clear coating.

Second to Eighth Samples

As shown in Table 1, second to eighth samples for which first and second base layers were formed with base paint compositions different from those of the first sample were produced. Such production was performed as in the first sample.

TABLE 1

| Sample | | 1 | 2 | 3 | 4 | 5 | 6 | 7 | 8 |
|---|---|---|---|---|---|---|---|---|---|
| Second Base Layer Acrylic Emulsion-Based Water-Based Paint | Perylene Red (mass %) | 2% (MN = 50 nm) | 2% (MN = 50 nm) | 2% (MN = 50 nm) | 2% (MN = 50 nm) | 2% (MN = 400 nm) | 2% (MN = 50 nm) | 2% (MN = 50 nm) | 2% (MN = 50 nm) |
| | Organic UVA (mass %) | 3% (MW = 659) | 3% (MW = 512) | 3% (MW = 700) | 3% (MW = 225) | 3% (MW = 659) | 3% (MW = 659) | 3% (MW = 659) | 3% (MW = 760) |
| | Inorganic UVA (mass %) | 2% (MN = 50 nm) | 2% (MN = 50 nm) | 2% (MN = 50 nm) | 2% (MN = 50 nm) | 2% (MN = 50 nm) | 2% (MN = 50 nm) | 0% | 2% (MN = 50 nm) |
| First Base | Perylene | 8% | 8% | 8% | 8% | 8% | 8% | 8% | 8% |

TABLE 1-continued

| Sample | | 1 | 2 | 3 | 4 | 5 | 6 | 7 | 8 |
|---|---|---|---|---|---|---|---|---|---|
| Layer Acrylic Emulsion-Based Water-Based Paint | Red (mass %) | (MN = 50 nm) | (MN = 50 nm) | (MN = 50 nm) | (MN = 50 nm) | (MN = 50 nm) | (MN = 50 nm) | (MN = 50 nm) | (MN = 50 nm) |
| | Organic UVA (mass %) | 3% (MW = 659) | 3% (MW = 512) | 3% (MW = 700) | 3% (MW = 225) | 3% (MW = 659) | 0% | 3% (MW = 659) | 3% (MW = 760) |
| | Inorganic UVA (mass %) | 2% (MN = 50 nm) | 2% (MN = 50 nm) | 2% (MN = 50 nm) | 2% (MN = 50 nm) | 2% (MN = 50 nm) | 2% (MN = 50 nm) | 2% (MN = 50 nm) | 2% (MN = 50 nm) |
| | Aluminum Flakes (mass %) | 12% | 12% | 12% | 12% | 12% | 12% | 12% | 12% |
| Evaluation | Initial Chroma (C*) | 34 | 35 | 33 | 33 | 24 | 33 | 31 | 28 |
| | Chroma (C*) after Weather Resistance Test | 32 | 32 | 30 | 25 | 21 | 25 | 26 | 24 |

"MN" indicates a number average particle size.
"MW" indicates a molecular weight.
"UVA" indicates an ultraviolet absorbing agent.
Regarding the organic UVA, "MW = 659," "MW = 225," and "MW = 760" indicate a benzotriazole-based UVA, and "MW = 512" and "MW = 700" indicate a triazine-based UVA.
The inorganic UVA is iron oxide.

The second to fourth samples use, for the first and second base layers, the organic ultraviolet absorbing agents having different molecular weights from that of the first sample. That is, the second sample uses a triazine-based ultraviolet absorbing agent (a molecular weight of 512) of CAS No. 371146-04-2, the third sample uses a triazine-based ultraviolet absorbing agent (a molecular weight of 700) of CAS No. 222529-65-9, and the fourth sample uses a benzotriazole-based ultraviolet absorbing agent (a molecular weight of 225) of CAS No. 2440-22-4.

The fifth sample is different from the first sample in that perylene red with an average particle size of 400 nm was used as the organic pigment of the second base layer.

The sixth sample is different from the first sample in that the mixing amount of the organic ultraviolet absorbing agent of the first base layer was zero.

The seventh sample is different from the first sample in that the mixing amount of the inorganic ultraviolet absorbing agent of the second base layer was zero and the amount of the organic ultraviolet absorbing agent of the second base layer was increased.

The eighth sample is different from the first sample in that a benzotriazole-based ultraviolet absorbing agent of CAS No. 84268-08-6 with a molecular weight of 760 was used as the organic ultraviolet absorbing agents of the first and second base layers.

Other configurations (each configuration of the substrate, the electrodeposition coating, and the transparent clear coating and the thickness of each of the first and second base layers in the dried state) of the second to eighth samples are similar to those of the first sample.

[Evaluation of Laminated Coating Film According to First to Eighth Samples]

A chroma (an initial chroma) right after paint finish for each of the first to eighth samples and a chroma after a weather resistance test were measured.

The weather resistance test was performed by a method specified according to JASO M 351 (Automotive Exterior Parts: Accelerated Weather Resistance Test by Xenon Arc Lamp) such that a radiant exposure is 600 MJ/m$^2$. Results are shown in Table 1.

The first to third samples show a high initial chroma and no great decrease in chroma after the weather resistance test.

On the other hand, the fourth sample shows a high initial chroma, but shows a low chroma after the weather resistance test. The organic ultraviolet absorbing agents used for the first and second base layers have low molecular weights, and therefore, it is recognized that deterioration of the pigment perylene red of the second base layer is accelerated due to deterioration of these organic ultraviolet absorbing agents.

The fifth sample shows a lower initial chroma as compared to the first sample, and as a result, also shows a lower chroma after the weather resistance test. It is recognized as described above because the particle size of the perylene red used for the second base layer is great.

The sixth sample shows a high initial chroma, but shows a low chroma after the weather resistance test. It is recognized as described above because the content of the organic ultraviolet absorbing agent of the first base layer is zero and the amount of transfer of the organic ultraviolet absorbing agent from the second base layer to the first base layer increases accordingly. That is, it is recognized as described above because protection of the perylene red from ultraviolet light by the organic ultraviolet absorbing agent of the second base layer becomes insufficient.

The seventh sample shows a lower initial chroma as compared to the first sample. It is recognized as described above because the amount of the high-molecular-weight organic ultraviolet absorbing agent of the second base layer is great. The chroma after the weather resistance test also shows a great decrement. The ultraviolet absorbing agent added to the second base layer is only the organic agent, and it is recognized as described above due to transfer and deterioration of the ultraviolet absorbing agent.

The eighth sample shows a lower initial chroma as compared to the first sample, and as a result, also shows a lower chroma after the weather resistance test. It is recognized as described above because the molecular weights of the organic ultraviolet absorbing agents used for the first and second base layers are excessively great and the chroma accordingly decreases due to an increase in diffused reflex caused by the ultraviolet absorbing agents.

DESCRIPTION OF REFERENCE CHARACTERS 1 vehicle body (steel plate) of automobile
2 electrodeposition coating
3 first base layer
4 second base layer
5 transparent clear layer
11 lustrous material
12 red pigment
13 organic high-molecular-weight ultraviolet absorbing agent
14 inorganic nanoparticle ultraviolet absorbing agent
15 organic red pigment
16 organic ultraviolet absorbing agent

The invention claimed is:

1. A laminated coating film for a coating target object, the laminated coating film comprising:
    a first base layer stacked on a surface of the coating target object and containing a lustrous material;
    a translucent second base layer stacked on a surface of the first base layer and containing an organic pigment; and
    a transparent clear layer stacked on a surface of the second base layer,
    wherein the coating target object is a vehicle body of an automobile or an interior or exterior part for the automobile,
    the first and second base layers contain an identical type of organic ultraviolet absorbing agent having a molecular weight of equal to or greater than 500 and equal to or less than 700, and
    the organic pigment is a red pigment.

2. The laminated coating film according to claim 1, wherein
    an average particle size of the red pigment is equal to or less than 100 nm.

3. The laminated coating film according to claim 2, wherein
    the red pigment is perylene red.

4. The laminated coating film according to claim 2 or 3, wherein
    the second base layer contains an inorganic ultraviolet absorbing agent having a particle size of equal to or less than 100 nm.

5. The laminated coating film according to claim 4, wherein
    the inorganic ultraviolet absorbing agent is an iron oxide nanoparticle.

6. The coated article according to claim 5, wherein
    the coating target object has an electrodeposition coating on a surface, and the first base layer is stacked on a surface of the electrodeposition coating.

7. The laminated coating film according to claim 1, wherein
    the first base layer contains a red pigment.

8. A coated article comprising:
    the laminated coating film according to claim 1 on the coating target object.

9. A laminated coating film formation method comprising:
    a step of coating a surface of a coating target object with first base paint to form an uncured first base layer;
    a step of coating a surface of the uncured first base layer with second base paint to form an uncured second base layer having translucency;
    a step of coating a surface of the uncured second base layer with clear paint to form an uncured transparent clear layer; and
    a step of simultaneously heating and curing the uncured first base layer, the uncured second base layer, and the uncured transparent clear layer,
    wherein the coating target object is an automobile vehicle body or an automobile interior or exterior part having a cured electrodeposition coating on a surface,
    the first base paint contains a lustrous material and an organic ultraviolet absorbing agent having a molecular weight of equal to or greater than 500 and equal to or less than 700, and
    the second base paint contains an organic red pigment and an organic ultraviolet absorbing agent identical to the ultraviolet absorbing agent of the first base paint, the ultraviolet absorbing agent having a molecular weight of equal to or greater than 500 and equal to or less than 700.

10. The laminated coating film formation method according to claim 9, wherein
    an average particle size of the red pigment is equal to or less than 100 nm.

11. The laminated coating film formation method according to claim 9, wherein
    the red pigment is perylene red.

12. The laminated coating film formation method according to claim 9, wherein
    the second base paint contains an inorganic ultraviolet absorbing agent having a particle size of equal to or less than 100 nm.

13. The laminated coating film formation method according to claim 12, wherein
    the inorganic ultraviolet absorbing agent is an iron oxide nanoparticle.

14. The laminated coating film formation method according to claim 9, wherein
    the first base paint contains a red pigment.

* * * * *